US006806306B2

(12) United States Patent
Chmielewski et al.

(10) Patent No.: US 6,806,306 B2
(45) Date of Patent: Oct. 19, 2004

(54) LOW TEMPERATURE, HIGHLY CHEMICALLY RESISTANT THERMOPLASTIC VULCANIZATES BASED ON PERFLUROETHER ELASTOMERS

(75) Inventors: Craig A. Chmielewski, Wixom, MI (US); Paul J. Hochgesang, Ann Arbor, MI (US)

(73) Assignee: Freduenberg-NOK General Partnership, Plymouth, MI (US)

( * ) Notice: Subject to any disclaimer, the term of this patent is extended or adjusted under 35 U.S.C. 154(b) by 298 days.

(21) Appl. No.: 10/152,903

(22) Filed: May 22, 2002

(65) Prior Publication Data

US 2002/0198320 A1 Dec. 26, 2002

Related U.S. Application Data

(60) Provisional application No. 60/292,706, filed on May 22, 2001, now abandoned.

(51) Int. Cl.$^7$ .......................... C08L 73/00; C08L 27/14; C08L 27/20
(52) U.S. Cl. ....................... 524/462; 524/544; 524/545; 524/546; 528/31; 528/25
(58) Field of Search .................. 524/462, 544, 524/545, 546; 528/25, 31

(56) References Cited

U.S. PATENT DOCUMENTS

| | | | | | |
|---|---|---|---|---|---|
| 4,565,714 | A | * | 1/1986 | Koshar ....................... | 427/515 |
| 5,300,587 | A | * | 4/1994 | Mascia et al. ............ | 525/359.3 |
| 5,367,001 | A | * | 11/1994 | Itoh et al. ................... | 523/109 |
| 6,528,562 | B2 | * | 3/2003 | Matsuda et al. ............ | 524/236 |
| 6,541,558 | B1 | * | 4/2003 | Sterling et al. ............. | 524/462 |
| 6,683,128 | B2 | * | 1/2004 | Turri et al. ................. | 524/515 |

* cited by examiner

Primary Examiner—Robert E. L. Sellers
Assistant Examiner—Marc S. Zimmer
(74) Attorney, Agent, or Firm—A. Michael Tucker; Ronald W. Wangerow

(57) ABSTRACT

A fluorine containing thermoplastic vulcanizate composition includes a continuous phase of at least one melt formable thermoplastic resin and a discrete phase of a vulcanized perfluoroether elastomer. The perfluoroether elastomer comprises between 10 and 80 weight percent based on the total amount of the continuous phase and the disperse phase combined.

15 Claims, No Drawings

LOW TEMPERATURE, HIGHLY CHEMICALLY RESISTANT THERMOPLASTIC VULCANIZATES BASED ON PERFLUROETHER ELASTOMERS

CROSS REFERENCE TO RELATED APPLICATION

This claims the benefit of U.S. provisional patent application identified as U.S. application Ser. No. 60/292,706, filed May 22, 2001, now abandoned.

BACKGROUND OF THE INVENTION

The present invention relates to thermoplastic vulcanizate (TPV) compositions containing fluorine.

A two phase composition comprising a continuous phase thermoplastic material and a disperse phase elastomer, produced by dynamically vulcanizing the elastomer while the discrete phase elastomer is dispersed in the continuous phase thermoplastic material, is known. Examples of such a composition can be found in the following U.S. Pat. Nos.: 4,348,502, 4,130,535, 4,173,556, 4,207,404 and 4,409,365.

Fluorocarbon resins and elastomers containing fluorine are known to excell in heat resistance. European Patent Application 1 68020A discloses two-phase blends containing fluorine. The elastomer used is substantially a vinylidene fluoride/hexafluoropropylene elastomer, and as its vulcanization method, polyol vulcanization by a combination of bisphenol AF, an acid receiving agent and an onium salt, or peroxide vulcanization by a combination of an organic peroxide and a polyfunctional unsaturated compound, is employed.

The compounds disclosed in EP 168020 require oven vulcanization (post cure) following dynamic vulcanization. With dynamic vulcanization alone, the material's mechanical properties tend to be inadequate, particularly the permanent strain. Also, following dynamic vulcanization, the compositions also tend to form powder, rendering them extremely difficult to subsequently melt process in standard thermoplastic processing equipment. Finally, the compounds of EP 168020A are inherently susceptible to chemical attack and degradation by chemically basic moieties.

U.S. Pat. No. 5,354,811 describes alternate two-phase dynamically vulcanized compounds based on a fluorocarbon resin continuous phase and a dispersed fluorocarbon elastomer dispersed phase. The fluorine containing elastomers have vulcanizable sites selected from the group consisting of epoxy groups, carboxylic acid groups, carboxylic acid derivative groups, sulfonic acid groups and sulfonic acid derivative groups.

SUMMARY OF THE INVENTION

It is desirable to compose and produce perfluoroether based TPVs that maintain their elastomeric properties down to extremely low temperatures, much lower than standard fluoroelastomer based TPVs. In addition, it is desirable to compose and produce perfluoroether based TPVs that melt process well and give good physical and mechanical properties without subjection to a post-cure processing cycle.

This invention provides a two phase composition comprising a perfluoroether and fluorinated thermoplastic, which is useful as a thermoplastic vulcanizate, that has excellent mechanical properties, heat resistance, fluids resistance, including fluids containing basic or alkaline moieties, and is easily melt processible. Moreover, the this invention includes a material that has elastomeric properties even at extremely low temperatures. Finally, a process for its production is disclosed.

This invention also includes a two-phase composition that can be obtained by using a fluoroelastomer with a perfluoroether polymer backbone that is dynamically vulcanized with an addition-curing silicone crosslinker.

This invention also includes a continuous thermoplastic fluorocarbon resin phase and a dispersed amorphous vulcanized perfluoroether containing elastomer phase, which is useful as a melt formable material having rubber elasticity.

Furthermore, this invention relates to a process for producing a fluorine containing thermoplastic vulcanizate composition, which comprises melt blending the above mentioned thermoplastic fluorocarbon resin and the non-vulcanized amorphous perfluoroether containing elastomer, followed by dynamically vulcanizing this blend to form elastomer particles dispersed in the thermoplastic fluorocarbon resin.

The compositions of this invention have the highly desirable property of low compression set. When articles made of these compositions are compressed for long periods of time, even at high temperatures, they have a strong tendency to return to their original size and shape. Also, the composition of this invention has excellent low temperature properties, meaning that it remains rubbery or elastomeric even at extremely low temperatures.

Another advantage is that articles made from the composition of this invention are highly fluid resistant, even to fluids containing chemically basic or alkaline components. Articles molded from the composition of the present invention can find use as seals and gaskets in applications where high temperatures and harsh chemical environments are common, for example in certain types of automotive or aerospace applications.

The present invention includes fluorine containing thermoplastic vulcanizate compositions comprising a continuous phase of at least one melt formable thermoplastic fluorocarbon resin and a fluoroelastomer with a perfluoroether polymer backbone that is dynamically vulcanized with an addition-curing silicone crosslinker.

Additionally, the present invention provides for the addition of fluoroelastomer based regrind, including and especially perfluoroether elastomer based regrind, to the perfluoroether elastomer based TPV to function as standard compound filler or to supplement the elastomeric portion of the TPV, providing additional elastomeric properties. The fluoroelastomer based regrind is chemically crosslinked fluoroelastomer elastomer compounds which are ground, for example by mechanical means, to particle sizes of less than 1000 micrometers, but preferably to less than 500 micrometers and most preferably to less than 100 micrometers. The fluoroelastomer based regrind, including perfluoroether elastomer based regrind, can exist in the perfluoroether elastomer based TPV at levels of up to 65 weight percent.

Further, the present invention provides a process for producing a fluorine containing thermoplastic vulcanizate composition, which comprises a step of melt blending at least one melt formable thermoplastic fluorocarbon resin and at least one fluorine containing elastomer with a perfluoroether polymer backbone and chemically crosslinking the elastomer, for example with an addition-curing silicone crosslinker, while exerting a mixing shear force at a temperature higher than the melting point of the thermoplastic fluorocarbon resins.

DETAILED DESCRIPTION OF THE INVENTION

A selected thermoplastic fluorocarbon resin for the present invention is required to have thermoplasticity, i.e., it is required to be melt-formable. Namely, it must be a resin whereby the melt flow or the volume flow rate described in ASTM D-1238 or ASTM-2116 can be measured at a temperature higher than the melting point. It is preferably a thermoplastic fluorocarbon resin that can be melt-formed at a temperature at which there is no problem of deterioration of the fluorine containing elastomer. Among usual thermoplastic fluorocarbon resins, all fluorocarbon resins except for polytetrafluoroethylene resins that cannot be melt formed, may be employed.

The thermoplastic fluorocarbon resin useful for the present invention is a thermoplastic fluorocarbon resin having a fluorine content of at least 35% by weight, which can be obtained by polymerizing an ethylenically unsaturated compound containing a completely or partially fluorinated fluoro-olefin, preferably at least one fluoroolefin selected from the group consisting of tetrafluoroethylene, hexafluoropropylene, trifluoroethylene, vinylidene fluoride, vinyl fluoride, trifluoroethylene chloride and a perfluoroalkylvinyl ether (wherein the alkyl group has from 1 to 8 carbon atoms).

The ethylenically unsaturated compound may, for example, be a non-fluorinated olefin such as ethylene of propylene, an alkylvinyl ether or a perfluoroalkyl ethylene, in addition to the above olefins.

Preferred among such polymers is a tetrafluoroethylene/hexafluoropropylene/vinylidene fluoride terpolymer, a tetrafluoroethylene/ethylene copolymer, a tetrafluoroethylene/hexafluoropropylene copolymer, a tetrafluoroethylene/perfluoropropylvinyl ether copolymer, a trifluoroethylene chloride/ethylene copolymer or a vinylidene fluoride polymer. Particularly preferred are a tetrafluoroethylene/hexafluoropropylene/vinylidene fluoride terpolymer and a tetrafluoroethylene/ethylene copolymer. Most preferred is a tetrafluoroethylene/hexafluoropropylene/vinylidene fluoride terpolymer. A plurality of fluorocarbon resins may be used in combination. These copolymers may have other copolymerizable components further copolymerized.

Suitable semi-crystalline fluorine containing thermoplastics are tetrafluoroethylene/hexafluoropropylene/vinylidene fluoride terpolymers which are available under the tradename THV from Dyneon LLC (Oakdale, Min.), such as grades THV 410, THV 500 and THV 610, especially the latter. The monomer ratio affects crystallinity, mechanical properties and melt temperature. These grades have fluorine contents in the range of 70 to 76 weight percent and have crystalline melting points of 155° C., 165° C. and 185° C. respectively. As an example of the monomer ratios in these terpolymers, THV410 has as a ratio of tetrafluoroethylene/hexafluoropropylene/vinylidene fluoride of 53/18/29 respectively. Generally an increase in the tetrafluoroethylene in the monomer mix leads to an increase in the crystalline melting point.

The fluorocarbon elastomers required for the present invention have a perfluoroether backbone of the type:

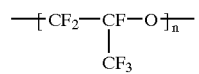

The perfluoroether monomer unit imparts outstanding properties such as good mechanical properties, heat resistance, exceptional low temperature resistance, chemical resistance, oil resistance, etc.

Further, in the uncrosslinked state the perfluoroether polymer may be end capped with a variety of chemically functional groups that may be used to chemically crosslink the polymer. Commonly used, but not limited to, are vinyl silicones groups.

Suitable amorphous fluoroelastomers based on perfluoroether backbones are available under the tradename SIFEL from Shin-Etsu Chemical Company (Tokyo, Japan), such as grades SIFEL 3701, SIFEL 3750, SIFEL 4750 and SIFEL 5701, especially the latter one listed. The fluorine content of these elastomers is about 69 weight percent.

The elastomer phase of the composition of this invention may be cured with conventional curing systems known for chemically reacting or activating the specific functional group attached to the ends of the perfluoroether polymers, causing the polymer to crosslink and form a macromolecular network. As an example, when the perfluoroether polymer is end capped with vinyl silicone functionality, crosslinkers incorporating silicon-hydride groups are used to provide the chemical bridges between the perfluoroether polymers, and hence the crosslinked network. The crosslinking reaction, in this case, is provided by a standard platinum addition curing mechanism.

The composition of the present invention may contain vulcanization accelerators, fillers, antioxidants, stabilizers, pigments, processing assistants, etc. in an amount at a level of common use.

The particle size of the chemically reacted dispersed phase, excluding the size of regrind which may be added, of the present invention varies depending upon the components of the composition, the proportions of the proportions of the respective components, the viscosities of the respective components, the production conditions, etc. However, the average particle size is usually preferably no larger than 50 micrometers, more preferably not larger than 10 micrometers and most preferably no larger than 5 micrometers.

The composition of the present invention may include fluoroelastomer based regrind, including and especially perfluoroether elastomer based regrind. The fluoroelastomer based regrind is chemically crosslinked fluoroelastomer compounds which are ground, for example by mechanical means, to particle sizes of less than 1000 micrometers, but preferably to less than 500 micrometers and most preferably to less than 100 micrometers. The fluoroelastomer based regrind, including perfluoroether elastomer based regrind, can exist in the perfluoroether elastomer based TPV at levels of up to 65 weight percent.

The process of the present invention comprises melt blending the thermoplastic fluorocarbon resin and the perfluoroether based elastomers at a temperature higher than the melting temperature of the fluorocarbon resin in either batch or continuous mixers, followed by vulcanizing the perfluoroether containing elastomer while exerting a mixing shear force. The temperature for mixing may be suitably selected depending on the types of thermoplastic fluorocarbon resin and the fluorine containing elastomer used.

It is necessary to conduct the vulcanization while exerting a mixing shear force. As the vulcanization is conducted while a mixing shear force is applied, the thermoplastic fluorocarbon resin will form a continuous phase, and a disperse phase, composed of a cured perfluoroether elastomer, will be uniformly dispersed in the continuous phase. Such a continuous phase will form even when the thermoplastic resin is not the major component. If the continuous and the disperse phases are reversed, that is if the thermoplastic fluorocarbon resin becomes the dispersed phase and the perfluoroether based elastomer the continuous phase, then the material would not be melt processible.

The present invention provides a two-phase composition comprising a continuous phase thermoplastic material and a disperse phase elastomer, produced by dynamic vulcanizing the elastomer—that is curing the elastomer while it is undergoing shear stress from mixing and after it has been melt mixed with the thermoplastic. A fluorocarbon resin is used as the thermoplastic phase and a perfluoroether based elastomer is used as the dispersed elastomeric phase. The present invention is useful as a thermoplastic vulcanizate, excellent in moldability, maintaining elastomeric properties at extremely low temperatures, mechanical properties and fluid resistance, even to fluids containing chemically basic moieties. The present invention also provides a process for its production.

The following examples of the present invention are presented. However, in no way do these examples limit the scope of the present invention. All data presented in the following examples were generated using standard ASTM test methods. The hardness test was performed according to ASTM D2240. The tensile properties were determined according to ASTM 412 and compression set according to ASTM D395. Fluid immersion testing was performed according to ASTM D471 and low temperature properties were measured according to ASTM D1053.

In addition, test plaques used to die cut test specimens were all prepared by compression molding material for 2 minutes at 250° C. and then cooling under pressure for 20 minutes until the temperature fell below 50° C.

EXAMPLES 1 & 2

Compositions of Examples 1 and 2 illustrate the present invention. The perfluoroether elastomer SIFEL 5701 is a millable heat curable rubber (HCR) produced by Shin-Etsu Chemical Company (Tokyo, Japan), containing vinyl silane functionality at the chain ends. Cat-CP-3 is platinum catalyst contained in a masterbatch and PLF-2 is a chain extender containing silicon-hydride chemical groups. Shin-Etsu Chemical Company also supplies both Cat-CP-3 and PLF-2. THV is a fluorothermoplastic comprised of the monomers tetrafluoroethylene (TFE)/vinylidene fluoride (VDF)/hexafluoropropylene (HFP) and is supplied by Dyneon LLC (Oakdale, Min.).

These compositions were prepared by melt mixing the perfluoroether elastomer with the fluorothermoplastic in a Brabender mixer for approximately 6 minutes at approximately 220° C. to 235° C. In Example 2 the SIFEL regrind was also added in this step. Next the platinum catalyst and silicon-hydride containing crosslinker were added and the reaction proceeded while mixing continued. The final product was solid at room temperature and had good thermoplastic consistency. Compositions and physical properties are shown in Table 1.

TABLE 1

|  |  | Example 1 wt. % | Example 2 wt. % |
|---|---|---|---|
| MATERIAL |  |  |  |
| Sifel 5701 |  | 66.3 | 61.8 |
| Cat-CP-3 |  | 1.2 | 1.1 |
| PLF-2 |  | 0.7 | 0.6 |
| THV Fluoroplastic |  | 31.8 | 26.5 |
| Sifel 4750 Regrind |  | 0.0 | 9.9 |

TABLE 1-continued

|  |  | Example 1 wt. % | Example 2 wt. % |
|---|---|---|---|
| Physical Properties |  |  |  |
| Hardness | Shore A | 85 | 83 |
| UTS | MPa | 6.6 | 6.71 |
| EB | % | 199 | 150 |
| M100 | MPa | 4.5 | 4.9 |
| Compression Set ASTM D395, Meth. B |  |  |  |
| 70 hours @ 60° C. | % | 35 | 24 |
| 70 hours @ 125° C. | % | 72 | 57 |
| Oil Age - SF105G (168 hrs @ 150° C.) |  |  |  |
| Volume Swell | % | +1 | +1 |

EXAMPLES 3 AND 4

Compositions of Examples 3 and 4 are the same as those for Examples 1 and 2, respectively. These perfluoroether TPVs were immersed in an automotive gear lube (Anglamol) containing 6 weight percent of a chemically basic friction modifier (Sturaco) that is extremely aggressive and deleterious to fluoroelastomers. Table 2 shows the property changes after soaking for 168 hours at 150° C. in this fluid blend. Very little volume change was observed, indicating that the perfluoroether TPVs are dimensionally stable in this aggressive fluid blend.

TABLE 2

94% Anglamol/6% Sturaco
168 hr/150° C.

| Physical Property Changes |  | Example 3 | Example 4 |
|---|---|---|---|
| Hardness change | Shore A pts. | −5 | −1 |
| UTS change | % | −33 | −24 |
| EB change | % | −65 | −38 |
| Volume change | % | 1 | 1 |

EXAMPLES 5 and 6

Compositions of Examples 5 and 6 are the same as those for Examples 1 and 2, respectively. Table 3 presents the results of the Gehman low temperature testing on the perfluoroether TPVs of Examples 1 and 2. The data of Table 3 show the exceptional low temperature properties of the perfluoroether TPVs.

TABLE 3

| Gehman Results | Example 5 ° C. | Example 6 ° C. |
|---|---|---|
| T2 | −5.0 | −5.0 |
| T5 | −34.1 | −37.2 |
| T10 | −43.1 | −49.6 |
| T100 | −60.0 | −59.4 |
| Freeze Point | −53.0 | −61.0 |

EXAMPLES 7 THROUGH 10

Compositions of Examples 7 through 10 illustrate the present invention and the effects of perfluoroether oils on the physical properties of the compounds. The compositions of Examples 7 through 10 contain similar ingredients to those of Examples 1 and 2, with the addition of Aflunox 400, a perfluoroether liquid manufactured by Unimatec Corporation (Tokyo, Japan). Compound preparation also follow that of Examples 1 and 2 with the perfluoroether oil added immediately following the addition of the perfluoroether elastomer.

The final product was solid at room temperature and had good thermoplastic consistency. Compositions and physical properties are shown in Table 4. Compositions of Examples 7 through 10 were found to have exceptional compression set values.

TABLE 4

|  |  | Example 7 wt. % | Example 8 wt. % | Example 9 wt. % | Example 10 wt. % |
|---|---|---|---|---|---|
| MATERIAL |  |  |  |  |  |
| Sifel 5701 |  | 66.7 | 64.7 | 58.5 | 54.9 |
| Cat-CP-3 |  | 1.2 | 1.2 | 1.0 | 1.0 |
| PLF-2 |  | 0.7 | 0.6 | 0.6 | 0.5 |
| THV Fluoroplastic |  | 26.7 | 25.9 | 23.4 | 27.5 |
| Aflunox 400 |  | 0.0 | 3.1 | 12.3 | 16.1 |
| Sifel 4750 Regrind |  | 4.8 | 4.6 | 4.2 | 0.0 |
| Physical Properties |  |  |  |  |  |
| Hardness | Shore A | 83 | 80 | 75 | 76 |
| UTS | MPa | 6.3 | 5.0 | 2.5 | 1.9 |
| EB | % | 151 | 137 | 109 | 64 |
| M100 | MPa | 4.6 | 3.8 | na | na |
| Compression Set ASTM D395, Meth. B |  |  |  |  |  |
| 70 hours @ 60° C. | % | 15 | 17 | 18 | 26 |
| 70 hours @ 125° C. | % | 17 | 19 | 23 | 31 |

EXAMPLES 11 THROUGH 14

Compositions of Examples 11 through 14 are the same as those for Examples 7 through 10, respectively. These perfluoroether TPVs were immersed in a simulated ethanol containing automotive fuel, Fuel C plus 10% ethanol. Fuel C is comprised of 50% isooctane and 50% toluene. Fuel C plus 10% ethanol, CE10, is a standard laboratory fluid used to simulate gasoline and is used here to determine its effect on the materials of this invention. Table 5 shows the property changes after soaking for 168 hours at 40° C. in this fluid blend. Again, relatively little volume change was observed, indicating that the perfluoroether TPVs are dimensionally stable in the simulated automotive fuel.

TABLE 5

| Immersion in CE10 168 hrs/ 40° C. Physical Property Changes |  | Example 11 | Example 12 | Example 13 | Example 14 |
|---|---|---|---|---|---|
| Hardness change | Shore A pts. | −13 | −12 | −12 | −12 |
| UTS change | % | −30 | −14 | −12 | −13 |

TABLE 5-continued

| Immersion in CE10 168 hrs/ 40° C. Physical Property Changes |  | Example 11 | Example 12 | Example 13 | Example 14 |
|---|---|---|---|---|---|
| EB change | % | −3 | −9 | −21 | −20 |
| M100 Change | % | −21 | −20 | na | na |
| Volume change | % | 9 | 9 | 9 | 8 |

EXAMPLES 15 THROUGH 18

Compositions of Examples 15 through 18 are also the same as those for Examples 7 through 10, respectively. These perfluoroether TPVs were immersed in a simulated high methanol containing automotive fuel, Fuel C plus 85% methanol. Fuel C plus 85% methanol, CM85, is a laboratory fluid used to simulate methanol based automotive fuels and is used here to determine its effect on the materials of this invention. Table 6 shows the property changes after soaking for 168 hours at room temperature, 23° C., in this fluid blend. Again, very little volume change was observed, indicating that the perfluoroether TPVs are dimensionally stable in the simulated automotive fuel.

TABLE 6

| Immersion in CM85 168 hrs/ 23° C. Physical Property Changes |  | Example 15 | Example 16 | Example 17 | Example 18 |
|---|---|---|---|---|---|
| Hardness change | Shore A pts. | −8 | −7 | −7 | −7 |
| UTS change | % | −14 | −14 | −2 | −1 |
| EB change | % | −3 | −23 | −24 | −34 |
| M100 Change | % | −12 | −14 | na | na |
| Volume change | % | 3 | 4 | 4 | 3 |

EXAMPLES 19 THROUGH 22

Compositions of Examples 19 through 22 are the same as those for Examples 7 through 10, respectively. Table 7 presents the results of the Gehman low temperature testing on the perfluoroether TPVs of Examples 7 through 10 respectively. This data can be combined with the data of Table 4 for this compositions. The data of Table 7 again show the exceptional low temperature properties of the perfluoroether TPVs.

TABLE 7

| Gehman | Example 19 | Example 20 | Example 21 | Example 22 |
|---|---|---|---|---|
| T2 | −12 | −13 | −19 | −18 |
| T5 | −37 | −38 | −42 | −44 |
| T10 | −45 | −45 | −48 | −51 |
| T100 | −57 | −59 | −59 | −60 |
| Freeze Point | −56 | −56 | −60 | −61 |

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A thermoplastic vulcanizate composition comprising:
   a continuous phase of at least one melt formable thermoplastic resin; and
   a discrete phase of a vulcanized perfluoroether elastomer.

2. The composition specified in claim 1 wherein the perfluoroether elastomer comprises between 10 and 80 weight percent based on the total amount of the continuous phase and the disperse phase combined.

3. The composition specified in claim 1 where the perfluoroether elastomer is end capped with chemically functional groups that provide sites for chemical reactions and crosslinking to form a crosslinked network.

4. The composition specified in claim 3 where the end capped chemical groups contain vinyl silane functionality.

5. The composition specified in claim 4 where the perfluoroether elastomer, containing vinyl silane containing end groups, is crosslinked with silicon-hydride containing molecules.

6. The composition specified in claim 5 where the reaction is catalyzed by a platinum catalyst system.

7. The composition specified in claim 1 wherein the thermoplastic Resin is a terpolymer of tetrafluoroethylene/vinylidene fluoride/hexafluoropropylene.

8. The composition specified in claim 1 wherein the thermoplastic fluorocarbon is a copolymer of tetrafluoroethylene/ethylene.

9. The composition specified in claim 1 wherein the thermoplastic fluorocarbon is a copolymer of tetrafluoroethylene/hexafluoropropylene.

10. The composition specified in claim 1 where fluoroelastomer regrind is added at levels up to 65 weight percent.

11. The composition specified in claim 10 where the average particle size of the regrind is less than 500 micrometers.

12. The composition specified in claim 10 where the regrind is composed of ground perfluoroether elastomer compounds.

13. A process for producing a fluorine containing thermoplastic vulcanizate composition, which comprises:
    melt blending at least one melt formable thermoplastic fluorocarbon resin and with a perfluoroether based elastomer to form a mixture, wherein the resin and elastomer are melt blended at a temperature higher than a melting temperature of the resin; and
    vulcanizing the mixture while maintaining the shear mixing forces.

14. The process according to claim 13 wherein at least one member selected from the group consisting of vulcanizing agents and vulcanization accelerators is added after the melt blending step and before the vulcanizing step.

15. Articles made from the composition of claim 1.

* * * * *

UNITED STATES PATENT AND TRADEMARK OFFICE
CERTIFICATE OF CORRECTION

PATENT NO. : 6,806,306 B2
DATED : October 19, 2004
INVENTOR(S) : Craig A. Chmielewski and Paul J. Hochgesang It is certified that error appears in the above-identified patent and that said Letters Patent is hereby corrected as shown below:

<u>Title page,</u>
Item [54], Title, "PERFLUROETHER" should read -- PERFLUOROETHER --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,806,306 B2 |
| APPLICATION NO. | : 10/152903 |
| DATED | : October 19, 2004 |
| INVENTOR(S) | : Chmielewski et al. |

It is certified that error appears in the above-identified patent and that said Letters Patent is hereby corrected as shown below:

On the Title Page, Item (73) reading "FREDUENBERG-NOK GENERAL PARTNERSHIP" should read --FREUDENBERG-NOK GENERAL PARTNERSHIP--.

Signed and Sealed this

Sixteenth Day of December, 2008

JON W. DUDAS
*Director of the United States Patent and Trademark Office*